(12) United States Patent
Stevens et al.

(10) Patent No.: US 8,019,559 B1
(45) Date of Patent: Sep. 13, 2011

(54) SONIC FLOW METER AND METHOD

(75) Inventors: Robert K. Stevens, Racine, WI (US);
Richard L. Little, Racine, WI (US);
William W. Roeber, Wind Lake, WI (US)

(73) Assignee: Racine Federated, Inc., Racine, WI (US)

( * ) Notice: Subject to any disclaimer, the term of this patent is extended or adjusted under 35 U.S.C. 154(b) by 534 days.

(21) Appl. No.: 11/807,819

(22) Filed: May 30, 2007

(51) Int. Cl.
*G01F 1/66* (2006.01)
*G06F 17/40* (2006.01)

(52) U.S. Cl. .......... 702/45; 702/48; 702/54; 73/861.05; 73/861.27

(58) Field of Classification Search .................... 702/45, 702/48, 46, 54
See application file for complete search history.

(56) References Cited

U.S. PATENT DOCUMENTS

| | | | |
|---|---|---|---|
| 5,012,449 A * | 4/1991 | Todd | 367/89 |
| 5,214,966 A | 6/1993 | Delsing | |
| 5,533,408 A | 7/1996 | Oldenziel et al. | |
| 5,796,009 A | 8/1998 | Delsing | |
| 5,932,812 A | 8/1999 | Delsing | |
| 6,067,861 A | 5/2000 | Shekarriz et al. | |
| 6,250,691 B1 | 6/2001 | Taylor et al. | |
| 6,532,828 B1 | 3/2003 | Delsing | |
| 6,745,632 B1 * | 6/2004 | Dryer et al. | 73/597 |
| 6,871,148 B2 * | 3/2005 | Morgen et al. | 702/48 |
| 2002/0062690 A1 * | 5/2002 | Kobayashi et al. | 73/204.27 |
| 2003/0125902 A1 * | 7/2003 | Freund et al. | 702/178 |
| 2005/0055171 A1 * | 3/2005 | Freund et al. | 702/89 |
| 2005/0288873 A1 * | 12/2005 | Urdaneta et al. | 702/45 |
| 2006/0174717 A1 | 8/2006 | Ishikawa | |
| 2007/0167792 A1 * | 7/2007 | Ohmuro et al. | 600/455 |
| 2007/0220995 A1 * | 9/2007 | Kishiro et al. | 73/861.28 |

OTHER PUBLICATIONS

Fuji Electric Systems Co., Ltd. Ultrasonic Flowmeter (2 pages) Aug. 30, 2005.
GE Ultrasonic Flowmeter (8 pages) 2005.

* cited by examiner

*Primary Examiner* — Hal Wachsman
(74) *Attorney, Agent, or Firm* — Wood, Phillips, Katz, Clark & Mortimer

(57) ABSTRACT

A flow meter and method for measuring flow in liquids which may have entrained bubbles or foreign matter. The meter performs alternate transit time and Doppler measurements. The transit time measurements are used to calculate flow so long as they are successful. If the transit time measurements are not successful, the Doppler measurements are used.

14 Claims, 5 Drawing Sheets

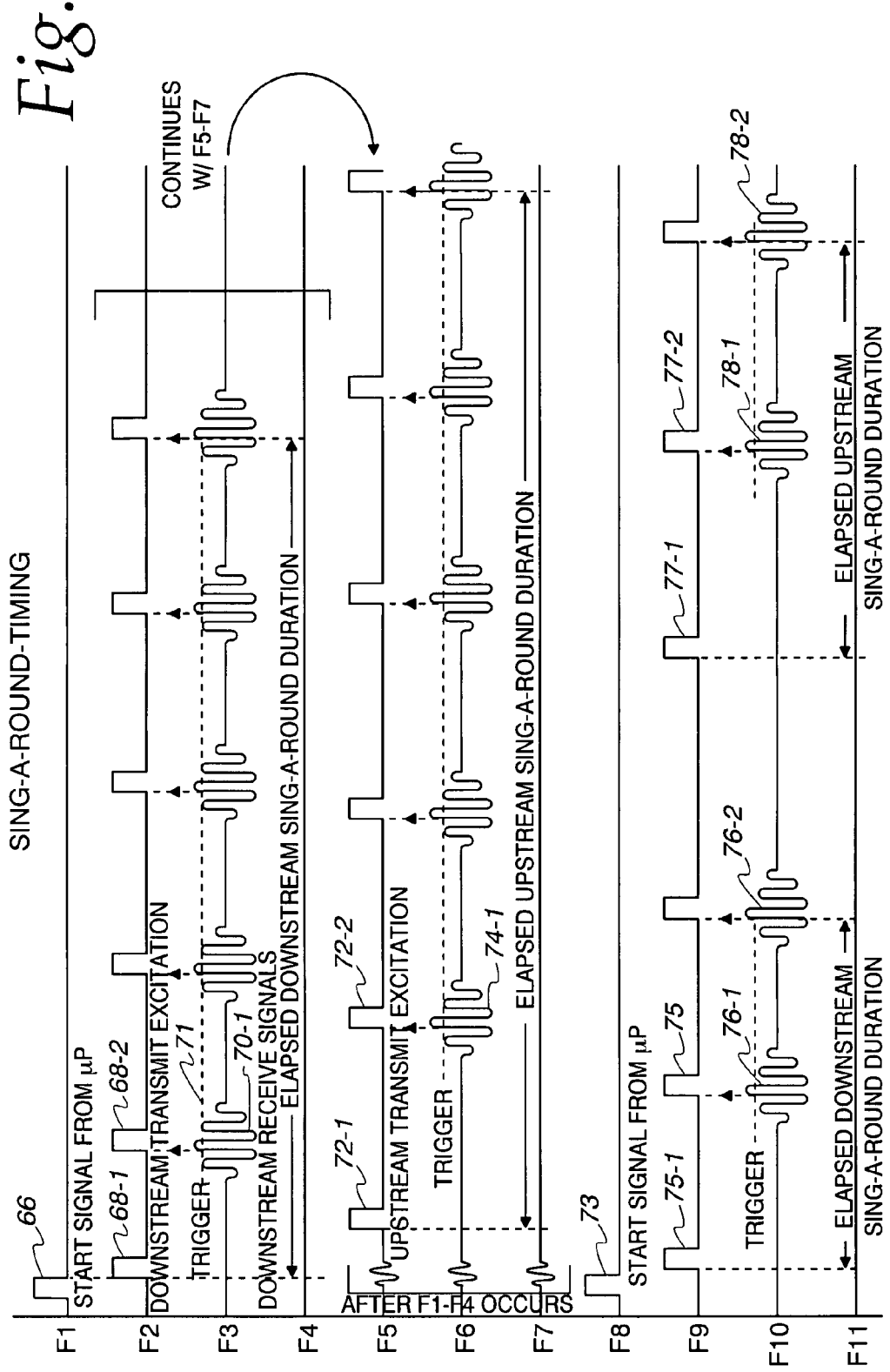

SONIC FLOW METER AND METHOD

BACKGROUND OF THE INVENTION

The measurement of flow of a liquid which may be contaminated with foreign particles or gas bubbles presents problems. Transit time measurements provide accurate flow measurement of uncontaminated liquid. However, when the liquid is contaminated, Doppler measurement provides more reliable flow measurement. For example, water pumped from the ground during the production of methane gas from a coal seam or other underground shale varies from crystal clear to milky white with entrained methane. Many applications also have intermittent suspended particulates of coal, rocks or sand in the water. Dual mode meters are known, see Oldenziel et al. U.S. Pat. No. 5,533,408, Shekarriz et al. U.S. Pat. No. 6,067,861, Morgen et al. U.S. Pat. No. 6,871,148, and Ishikawa published application 2006/0174717.

BRIEF SUMMARY OF THE INVENTION

The meter and method of this invention perform alternate periods of transit time and Doppler measurements. Transit time measurements are used to determine flow so long as the transit time measurements are successful, e.g., 10% of transit time sing-arounds (SARs) are successful. If the transit time measurements are not successful, the Doppler measurements are used.

Another feature is that flow is calculated from the average of successive transit time flow measurements; and further that an expected difference time range is established based on the average difference time and that measured difference times outside the expected range are discarded.

A further feature is the method for developing an "empty pipe" indication in the absence of transit time SAR success and Doppler flow measurements.

Yet another feature is a start-up method for circuitry for conducting Doppler flow measurements which establishes a gain limit for the automatic gain control of an amplifier for the Doppler difference frequency signal.

And another feature for a sing-around transit time flow meter in which transmission of a pulse is triggered by receipt of the preceding pulse is a method identifying an erroneous trigger which comprises comparing the results of first and second sing-around measurements, the first and second measurements used comprising different numbers of sing-around measurements.

Further features of the invention will be apparent from the following detailed description and from the drawings.

BRIEF DESCRIPTION OF THE DRAWINGS

FIG. 3 is a timing diagram for the sing-around transit time mode of operation of the meter.

DETAILED DESCRIPTION OF THE INVENTION

Figure 1:
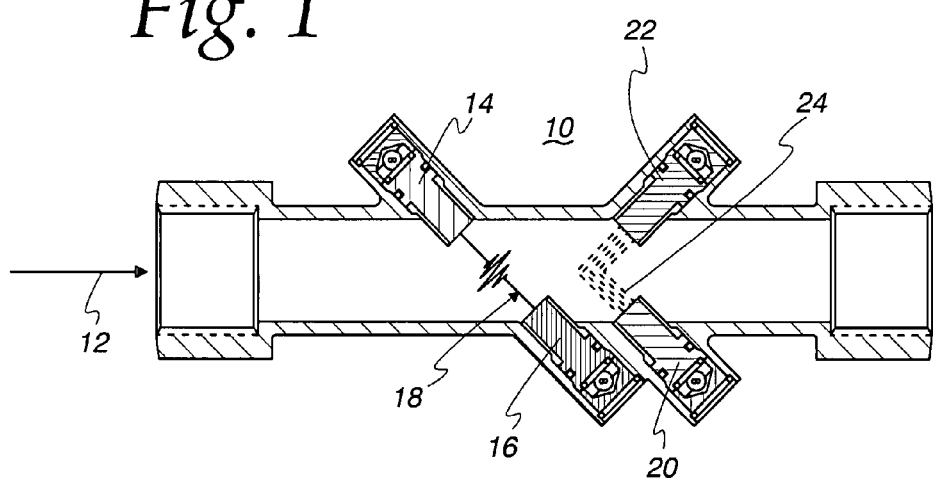
FIG. 1 is a longitudinal section of a transducer assembly for the meter.

A pipe section 10, FIG. 1, serves as a housing for the transducers used in conducting the transit time and Doppler flow measurements. The pipe section 10 is connected in the pipe line for the flow of liquid to be measured with the primary flow direction as indicated by arrow 12. The transit time transducers 14, 16 are mounted in alignment on opposite sides of the housing with a signal path 18 between them, at an angle of the order of 45 degrees to the pipe axis. When the transducer 14 serves as transmitter and transducer 16 as receiver, the sonic signal travels downstream with the liquid flow and transit time is reduced. When the transducer 16 serves as transmitter and transducer 14 as receiver, the sonic signal travels upstream against the liquid flow and transit time is increased. Doppler transducers 20, 22 are both directed toward the center of housing 10. The signal from transmitting transducer 22 is reflected to receiving transducer 20 along signal path 24 by bubbles or particulate matter if present in the liquid. A flow display (not shown) may be mounted on the transducer housing 10.

During the course of the following description of the operation of the meter, specific information will be given regarding operating parameters. This information is exemplary and should not be considered limiting unless specifically so stated.

Figure 2:
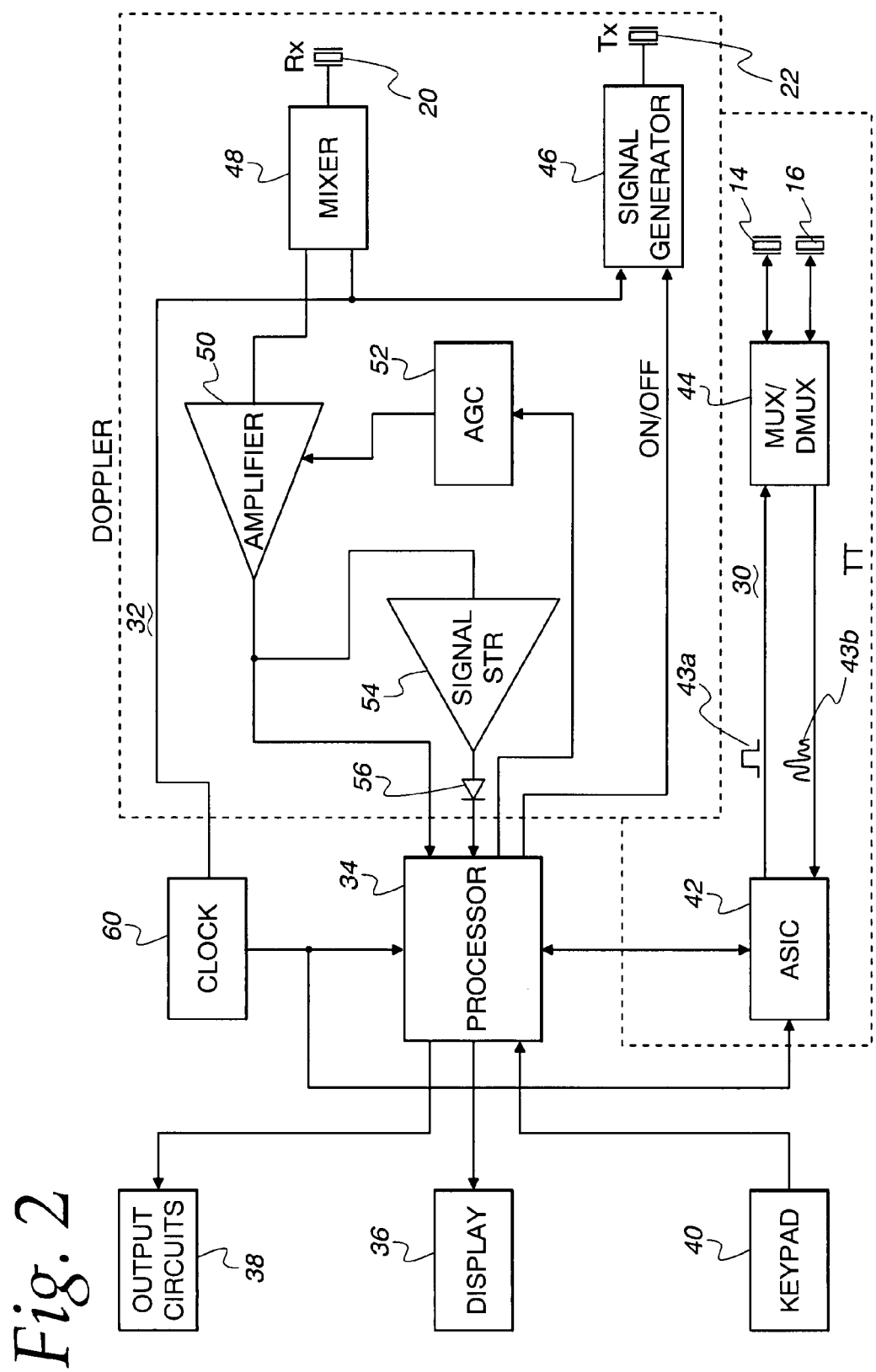
FIG. 2 is a block diagram of the meter.

The flow meter circuitry is illustrated in block form in FIG. 2. Transit time section 30 and Doppler section 32 are both controlled by a programmed processor 34 which also receives the transit time and Doppler measurements to calculate flow signals for display 36 and for other output circuits 38, and to perform other calculations and analyses of the measurements, as will appear. A keypad 40 provides for user input, to select display parameters, for example.

The transit time section 30 comprises an application specific integrated circuit (ASIC) 42 which conducts sing-around transit time flow measurements. A suitable circuit is the D-Flow UFO ASIC, available from D-Flow Technology AB, Lulea, Sweden. The ASIC 42 measures the transit time for sonic pulses downstream and upstream between transducers 14 and 16 as described in more detail below. Additional information regarding sing-around measurements can be found in Delsing U.S. Pat. Nos. 5,214,966 and 5,796,009.

ASIC 42 is connected through multiplexer/demultiplexer 44 with transducers 14, 16. A transit time measurement is initiated by a pulse 43a from ASIC 42 which is connected with the transmitting transducer. The square wave pulse 43a excites a piezo transducer to generate a sinusoidal burst. The received signal 43b is connected through the demultiplexer from the receiving transducer to an input of ASIC 42. After several pulses are transmitted downstream from transducer 14 to transducer 16, a like number of pulses are transmitted upstream from transducer 16 to transducer 14. ASIC 42 measures the upstream and downstream sound travel durations and provides this information to processor 34. The processor 34 utilizes these travel durations to calculate difference time.

Doppler section 32 has a signal generator 46 which is connected with transmitting transducer 22. The signal generator 46 is connected to a clock 60 to generate a short burst of RF signal. Sound travels into the liquid and is reflected off of particulates or bubbles that are suspended in the liquid and moving at a velocity that is substantially similar to the velocity of the liquid. If the suspendeds are moving away from the transmitter source the reflected signal will be at a lower frequency than the transmitted frequency. If the suspendeds are moving towards the transmitter source the reflected signal will be at a higher frequency than the transmitted frequency. The magnitude of the frequency change is directly proportional to the velocity of the suspendeds. The reflected signal received at transducer 20 is connected with mixer 48 where it is mixed with the transmitted frequency. The mixer 48 is also connected to the clock 60 and undersamples the received signal synchronously with the transmitted signal so that an alias frequency is created that is equal to the Doppler. The frequency difference signal or Doppler signal is connected with amplifier 50 and to processor 34. Amplifier 50 has gain controlled by AGC circuit 52 to optimize the amplitude of the Doppler signal for processing. The output of amplifier 50 is also connected with signal strength amplifier 54, the output of which is rectified by diode 56 and a DC signal representing the Doppler signal strength is connected with processor 34. In turn, an AGC control signal is connected from processor 34 with AGC circuit 52, controlling the gain of Doppler signal amplifier 50.

Clock 60 also provides time signals to processor 34 and ASIC 42.

Briefly, under the control of processor 34, alternate periods of transit time and Doppler flow measurements are conducted. If a predetermined percentage of the transit time measurements are successful, as will be described below, processor 34 calculates flow from the transit time measurements. If, however, a predetermined percentage of the transit time measurements are not successful, processor 34 calculates flow from the Doppler signal provided by amplifier 50. Alternate transit time and Doppler measurements continue and if the predetermined percentage of the transit time measurements are again successful the flow signal is calculated from the transit time measurements. The percentage of successful transit time measurements is greater for switching from Doppler to transit time than for switching from transit time to Doppler, to avoid instability.

Outputs from processor 34 are provided to display 36 showing flow rate and total flow, and/or to other output circuits 38 which might include a 4-20 milliamp transmitter to a remote display, a recorder, or the like. Keypad 40 may be used to select display parameters, as milliliters per minute or gallons per hour, for example.

The sing-around (SAR) transit time measurements are preferably made as illustrated by the timing diagrams F1-F7, FIG. 3. The time relationships of FIG. 3 are enlarged for clarity. A pulse 66, F1, is a start signal from processor 34 to ASIC 42. The ASIC generates pulse 68-1, F2, which is connected with transducer 14 and a sinusoidal burst is transmitted in the downstream direction. The received signal 70-1, F3, comprises several cycles of a sinusoid. When a lobe of the received signal exceeds a trigger level 71 set by processor 34, a second transmitted pulse 68-2 is generated. A plurality, here five, downstream signals are transmitted. ASIC 34 then generates an interrupt to processor 34 which uploads the total downstream sing-around time from the ASIC. Processor 34 then sends a command to ASIC 34 to reverse direction and transmit the same plurality of signals in the upstream direction, as shown at F5-F7. ASIC generates transmitted pulse 72-1. Received signal 74-1 triggers the second transmitted pulse 72-2. After five upstream sing-arounds have been completed the elapsed upstream sing-around time is uploaded to processor 34 for calculation of the difference time between downstream and upstream sing-around. The sing-around measurements are repeated ten times, approximately 500 milliseconds. Processor 34 then ceases transit time measurements and initiates Doppler measurements for 500 milliseconds.

The transit time and Doppler measurements are collected in first-in, first-out (FIFO) buffers in the processor 34. An average of several most recent measurements is used in calculating flow for display 46 and output circuits 38.

Figure 4A:
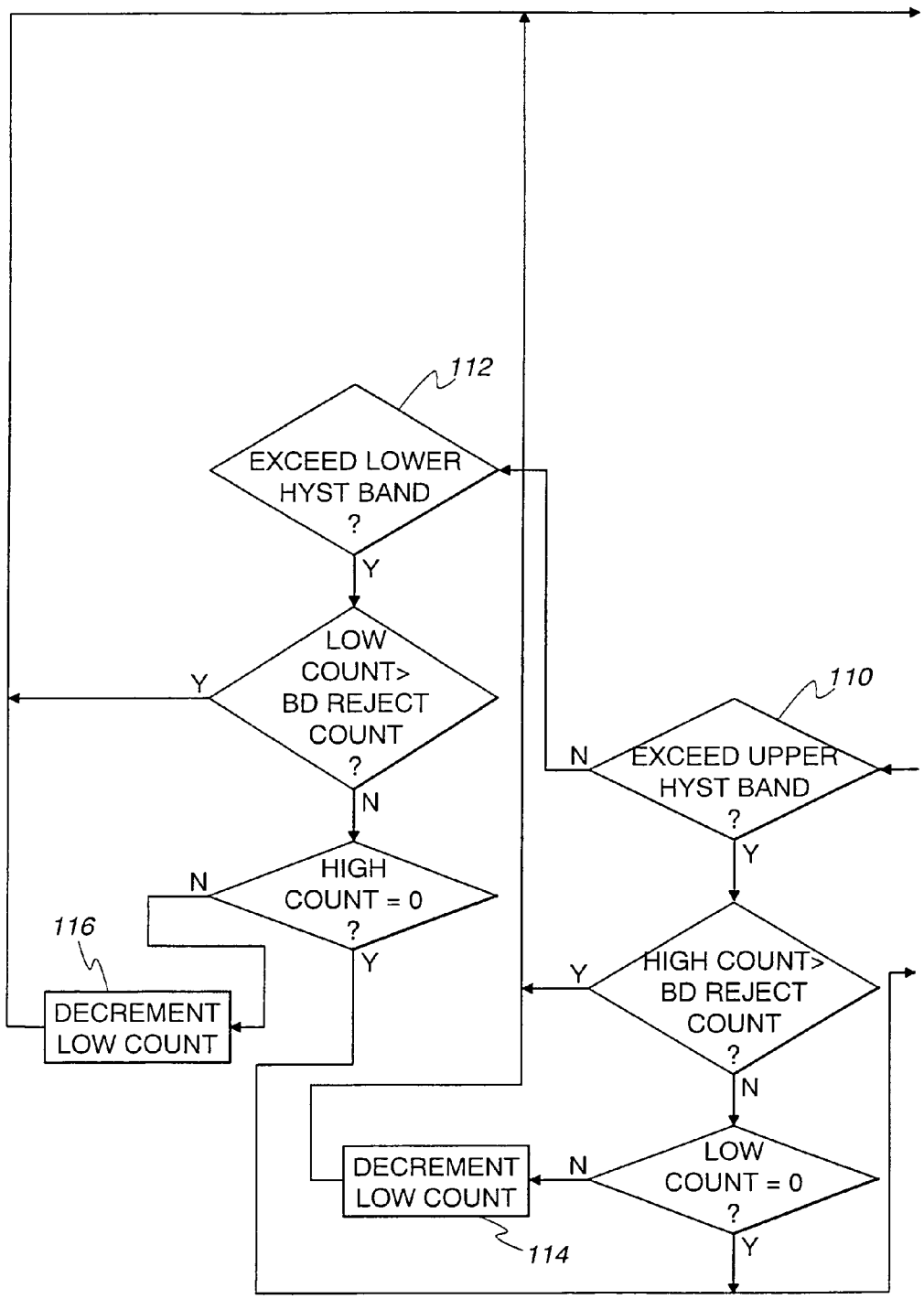
FIGS. 4A and 4B comprise a simplified logic diagram useful in an explanation of the transit time/Doppler decision logic operation of the meter.
Figure 4B:
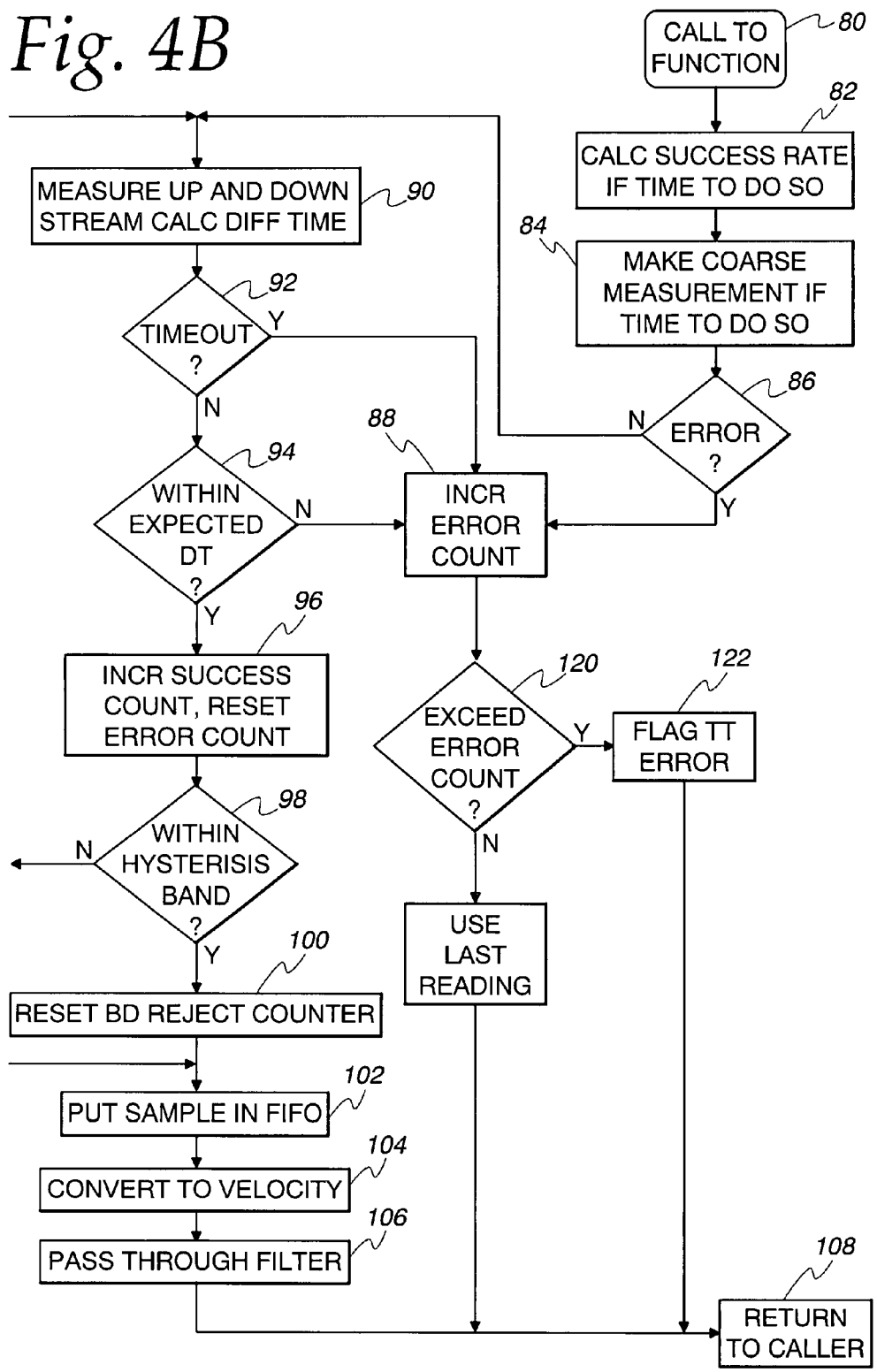

Further features of the meter will be explained in connection with the simplified logic diagram of FIGS. 4A and 4B.

A sequence of the logic is initiated by call to function at block 80. The success rate is calculated at block 82 every 20 transit time attempts. The number of successful attempts is divided by the total number of attempts (20) and the resulting percentage is placed in a FIFO buffer which holds the last six values of success percentage. If the average success rate of all samples in the FIFO buffer drops below a selected level, e.g., 10%, the meter will use the Doppler measurements. The success rate buffer continues to collect transit time success rates. When the success rate exceeds a different and higher selected level, e.g., 12%, the meter will again display flow based on the transit time measurements.

At block 84, a coarse SAR transit time measurement is made as a reference measurement to compare with the succeeding standard 10 SAR measurements to identify possible false triggers that can become masked inside of multiple SARs. For example, at full flow, a meter with a one inch diameter transducer housing has a difference time on the order of 90-100 nanoseconds (nSec). A measurement limit of 120 nSec can be integrated into the software that rejects measurements that exceed absolute 120 nSec. If the transit time system generates 2 MHz pulses, then the period is 500 nSec. As a result, a single erroneous trigger in one of the multiple SARs will influence the SAR time cycle by 500 nSec—or one 2 MHz cycle. If the standard SAR count is 5, an effective 100 nSec (500 nSec/5) error will be introduced to the transit time measurement. This error can fall within the 120 nSec limit and may not be caught and rejected, leading to a large measurement error. If the coarse 2 SAR cycle, which does not contain sufficient timing resolution to be utilized for flow rate measurement, has the identical 500 nSec error occur, the result will be 250 nSec (500 nSec/2)—an obvious error. A successful coarse SAR measurement that computes less than 120 nSec of difference time is considered to be valid. If the standard SAR measurement computes to within 50 nSec of the coarse measurement difference time it is considered valid.

To detect this situation, a coarse measurement is made every twenty standard SAR measurements using two SARs as shown in FIG. 3 at F8-11. The coarse measurement is initiated by a pulse 73, F8, from the processor which causes the ASIC to generate signal 75-1, F9. Received signal 76-1, F10 in turn triggers transmitted pulse 75-2 and received signal 76-2. Similarly, the upstream transmitted signal 77-1, initiated by the ASIC, results in received signal 78-1 which triggers transmitted signal 77-2 and received signal 78-2. A missed trigger on a two SAR cycle would lead to a 250 nSec error which is very obvious. The results of the two SAR measurements are compared with the following twenty SAR measurements to make sure that the difference times are within 50 nSecs of each other. Any readings from the twenty SAR measurements outside the 50 nSec window are discarded.

If there is no error at decision block 86, the program continues to calculate the difference time at block 90. If there is an error, an error count is incremented at block 88.

If no echo is received within 2 milliseconds, a time-out error is identified at decision block 92 and the error counter incremented at block 88. The difference time is compared with an expected difference time for a valid coarse measurement, to be described below, at decision block 94. If the time is within the expected difference time, the success counter is incremented at block 96 and the error counter is reset. A hysteresis band is established around the current expected decision time. If the calculated difference time is within the hysteresis band, a bad data reject counter, to be described, is reset at block 100. The difference time sample is put in a FIFO buffer where it is averaged with other difference times to establish the expected difference time used in decision block 94. The average of difference times in the difference time FIFO buffer is converted to a flow velocity at block 104. This information is filtered and displayed and the program returns to the call to function block 80.

DT readings outside the hysteresis band are discarded. However, provision is made for recognizing a trend of several successive DT measurements either above or below the hysteresis band. When this occurs, DT measurements are added to the difference time buffer and influence the expected difference time. This provides relatively stable flow reading values when at times the actual flow rate can be erratic.

Decision blocks 110, 112 identify the difference time measurements above and below the hysteresis band, respectively. High and low counters are preset for a selected number of out of hysteresis measurements. When an out of hysteresis measurement occurs, the appropriate counter is decremented at blocks 114, 116. If several successive out of hysteresis measurements occur, the associated counter goes to zero and the last discarded measurement is added to the difference time buffer. The high and low counters are then reset.

If successive errors at decision blocks 86, 92, and 94 exceed a selected number, decision block 120 flags a transit time error at block 122. This in turn initiates a success rate calculation at block 82.

In initiating operation of the meter, a gain limit for the Doppler signal amplifier is established to minimize interference from ambient electrical noise. With signal generator 46 off and the AGC at a minimal gain level, a base signal strength at the output of amplifier 50 is established. AGC is increased until the signal strength from the amplifier begins to increase. The gain at which this occurs is established as the gain limit to be used during Doppler flow measurements. The amplifier gain is then reduced to the minimal value and a signal transmitted. The AGC is then adjusted as needed, up to the gain limit, to provide Doppler signals to processor 34 at an optimum amplitude.

An "empty pipe" indication is provided on display 36 in the absence of both successful sing-arounds in the transit time mode and Doppler frequency measurements with amplifier 60 at maximum gain.

What is claimed is:

1. A sonic flow meter, comprising:
   transducers and circuitry for conducting sonic transit time flow measurements;
   transducers and circuitry for conducting sonic Doppler flow measurements; and
   a programmed processor connected with both transit time and Doppler circuitry, the programmed processor controlling both transit time and Doppler circuitry to conduct alternate periods of transit time and periods of Doppler flow measurements, the programmed processor responding to the transit time flow measurements to determine whether the transit time flow measurements are successful, and the programmed processor further responding only to the transit time flow measurements to calculate flow when the transit time flow measurements are successful or responding only to the Doppler flow measurements to calculate flow only when the transit time flow measurements are not successful.

2. In a sonic flow meter having transducers and circuitry for conducting transit time flow measurements and transducers and circuitry for conducting Doppler flow measurements, a method of measuring flow, comprising:
   conducting alternate periods of transit time and Doppler flow measurements;
   utilizing only the transit time flow measurements to determine flow if when the transit time flow measurements are successful; and
   utilizing only the Doppler flow measurements to determine flow only if when the transit time measurements are not successful.

3. The method of claim 2 in which each period of transit time measurements comprises a plurality of sing-around measurements and including the steps of:
   determining the successful percentage of sing-around measurements;
   using the sing-around measurements to determine flow when the successful percentage exceeds a selected percentage; and
   using the Doppler measurements to determine flow when the successful percentage is less than said selected percentage.

4. The method of claim 3 in which when Doppler measurements are utilized to determine flow and the successful percentage of sing-around measurements exceeds a selected percentage greater than the selected percentage of claim 3, the method includes the step of thereafter utilizing the sing-around measurements to determine flow.

5. The method of claim 3 in which a plurality of sing-around measurements are made during each transit time measurement period and the successful percentage of sing-around measurements is determined for a plurality of transit time measurement periods.

6. A method of developing an empty pipe indication for a meter measuring flow through a pipe, comprising:
   initiating a transit time measurement of flow through said pipe;
   initiating a Doppler measurement of flow through said pipe;
   determining whether the transit time flow measurement is successful;
   determining whether the Doppler flow measurement is successful; and
   developing an empty pipe indication in the absence of both successful transit time and successful Doppler flow measurements.

7. The method of claim 6 wherein the Doppler measurement is performed by a circuit with a variable gain received signal amplifier and the absence of a Doppler flow measurement occurs with maximum gain.

8. A startup method for a circuit for conducting Doppler flow measurements, the circuit comprising a signal transmitter, a signal receiver for developing a flow related signal at a Doppler difference frequency, an amplifier for the flow related signal, and an automatic gain control (AGC) for the amplifier, the method comprising:
   (a) establishing a base value of the signal strength for the amplifier in the absence of a transmitted signal and with the AGC at a minimal gain;
   (b) increasing AGC until the signal strength from the amplifier begins to increase above the base value;
   (c) establishing the amplifier gain of paragraph (b) as the gain limit to be used during Doppler flow measurements;
   (d) reducing AGC to the minimal value;
   (e) transmitting a Doppler initiation signal; and
   (f) adjusting the AGC as needed, up to the gain limit, to provide flow related received Doppler signals at an optimum amplitude.

9. In a sing-around (SAR) transit time sonic flow meter in which flow is measured by comparing upstream and downstream transit times of sonic pulses between transmitting and receiving transducers, successive transmitted pulses being triggered by receipt of a previous trigger pulse, a method for identifying a missed trigger which comprises:

conducting first SAR measurements with a first plurality, at least 3, of transmitted and received sonic pulses;

conducting second SAR measurements with a second plurality, less than the first plurality, of transmitted and received sonic pulses;

comparing the results of the first and second SAR measurements; and discarding the results of the first SAR measurements if the difference between the results of the first and second SAR measurements exceeds a threshold indicating that a trigger pulse is missing.

10. The method of claim 9 in which the second SAR measurements are conducted once for each set of a plurality of first SAR measurements.

11. The method of claim 10 in which the second SAR measurements are conducted once for each set of twenty first SAR measurements.

12. The method of claim 9 in which the first plurality is at least five and second plurality is two.

13. In a sonic flow meter, a method of calculating flow, comprising:

conducting successive upstream and downstream sonic transit time measurements;

calculating the difference time (DT) between upstream and downstream measurements;

storing the most recent DTs;

calculating the average of stored DTs;

calculating flow from the average of stored DTs;

establishing an expected DT range based on the calculated average DT; and discarding a DT outside the expected DT range.

14. The method of claim 13 further comprising:

establishing a hysteresis band for the average DT;

discarding DT measurements outside the hysteresis band until a plurality of successive measurements either above or below said hysteresis band indicates a valid trend change of flow; and thereafter adding the last discarded DT to the stored DTs from which the average is calculated.

* * * * *